United States Patent
Lewis et al.

(10) Patent No.: US 9,294,757 B1
(45) Date of Patent: Mar. 22, 2016

(54) 3-DIMENSIONAL VIDEOS OF OBJECTS

(71) Applicant: Google Inc., Mountain View, CA (US)

(72) Inventors: Thor Lewis, San Francisco, CA (US); Alley Rutzel, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/835,887

(22) Filed: Mar. 15, 2013

(51) Int. Cl.
| H04N 13/02 | (2006.01) |
| H04N 5/262 | (2006.01) |
| H04N 5/77 | (2006.01) |
| G06F 3/038 | (2013.01) |

(52) U.S. Cl.
CPC ............ *H04N 13/0242* (2013.01); *G06F 3/038* (2013.01); *H04N 5/2628* (2013.01); *H04N 5/772* (2013.01)

(58) Field of Classification Search
CPC ...................................................... G06T 19/00
USPC ........................................................ 345/419
See application file for complete search history.

(56) References Cited

U.S. PATENT DOCUMENTS

| | | | | |
|---|---|---|---|---|
| 6,084,979 | A * | 7/2000 | Kanade et al. ................ 382/154 |
| 6,154,251 | A | 11/2000 | Taylor | |
| 6,535,226 | B1 | 3/2003 | Sorokin et al. | |
| 6,741,250 | B1 * | 5/2004 | Furlan ................... G06T 19/003 345/427 |
| 6,791,542 | B2 | 9/2004 | Matusik et al. | |
| 6,983,064 | B2 | 1/2006 | Song | |
| 7,035,453 | B2 * | 4/2006 | Liu ............................... 382/154 |
| 7,106,361 | B2 * | 9/2006 | Kanade et al. ................ 348/159 |
| 7,583,815 | B2 * | 9/2009 | Zhang et al. .................. 382/103 |
| 7,595,816 | B1 * | 9/2009 | Enright et al. ................ 348/150 |
| 7,640,515 | B2 * | 12/2009 | Balakrishnan .......... G06F 3/038 715/848 |
| 7,884,848 | B2 | 2/2011 | Ginther | |
| 8,060,908 | B2 | 11/2011 | Bountour et al. | |
| 8,125,481 | B2 * | 2/2012 | Gossweiler, III ....... G06T 19/00 345/419 |
| 8,155,186 | B2 * | 4/2012 | Murakami ........... H04N 19/597 375/240.12 |
| 8,204,299 | B2 | 6/2012 | Arcas et al. | |
| 8,223,192 | B2 * | 7/2012 | Gotsman .............. H04N 5/2628 348/36 |
| 8,270,704 | B2 | 9/2012 | Kim et al. | |
| 8,462,198 | B2 * | 6/2013 | Lin et al. ......................... 348/43 |
| 8,812,990 | B2 * | 8/2014 | Reponen ............... G06F 3/0346 715/848 |
| 2004/0104935 | A1 * | 6/2004 | Williamson et al. .......... 345/757 |
| 2005/0088515 | A1 | 4/2005 | Geng | |
| 2011/0050929 | A1 | 3/2011 | Lee et al. | |
| 2013/0135315 | A1 * | 5/2013 | Bares et al. .................... 345/473 |
| 2013/0278727 | A1 | 10/2013 | Tamier et al. | |

FOREIGN PATENT DOCUMENTS

WO      WO 0058913      10/2000

OTHER PUBLICATIONS

Google patent search.pdf (online search).*

(Continued)

*Primary Examiner* — William C Vaughn, Jr.
*Assistant Examiner* — Luis Perez Fuentes
(74) *Attorney, Agent, or Firm* — Lowenstein Sandler LLP

(57) ABSTRACT

A plurality of cameras capture images of an object from different viewpoints. The images from each of the cameras are used to generate a 3D video of the object. The 3D video is provided to a user for viewing the object. The user may switching between different viewpoints of the 3D video while viewing the 3D video. A media viewer may be provided to a user and the media viewer may allow the user to specify different viewpoints and to control playback of the 3D video.

20 Claims, 9 Drawing Sheets

(56) References Cited

OTHER PUBLICATIONS

Wilburn, et al., "High Performance Imaging Using Large Camera Arrays", ACM Transactions on Graphics 24.3 (2005): 765-776. (Retrieved on Nov. 14, 2012 from: http://graphics.stanford.edu/papers/CameraArray/CameraArray_Sig05.pdf).

David Shaman, "SceneNet turns mobile video clips into (almost) live, 3D events," SceneNet, May 12, 2014.

Puneet Jain et al., "Focus: Clustering Crowdsourced Videos by Line-of-Sight," SenSys '13, Nov. 11-15, 2013.

Guanfeng Wang et al., "Active key frame selection for 3D model reconstruction from crowdsourced geo-tagged videos," 15th IEEE International Conference on Multimedia & Expo (ICME 2014), 2014.

* cited by examiner

3-DIMENSIONAL VIDEOS OF OBJECTS

BACKGROUND

Computing devices such as smart phones, cellular phones, laptop computers, desktop computers, netbooks, tablet computers, etc., are commonly used for a variety of different purposes. Users often use computing devices to user, play, and/or consume digital media items (e.g., view digital images, watch digital video, and/or listen to digital music). Users also use computing devices to shop for items and/or services online (e.g., purchase products and/or services via an online store of a merchant, vendor, and/or service provider). For example, a user may use a web browser on a computing device to browser a website of an online merchant and view products sold by the online merchant, information about products, and reviews of the products. Many vendors, merchants and/or service providers may provide videos of the products and/or services that the vendors, merchants and/or service providers may sell or provide. Users often use a media viewer (e.g., a media player application) to view these videos when determining whether to purchase a product and/or service. For example, a user may view a video of a coat in order to determine how the coat may look, feel, and/or fit, before purchasing a coat from a vendor. Users also use computing devices to view video content such as tutorials (e.g., a tutorial of how to perform an action, such as fixing light switch), demonstrations (e.g., demonstrations of products and/or services) and/or other information. These videos of the products, services, tutorials, and/or demonstrations are often from one viewpoint or vantage point.

SUMMARY

In one embodiment, a method of providing a 3-dimensional (3D) video an object is provided. Multiple cameras may capture images and/or videos of the object from different viewpoints. The multiple cameras may capture images and/or videos of the object synchronously. Each camera may generate an array of images (e.g., an image array). The image arrays generated by each camera may be processed to generate a 3D video of the object.

In one embodiment, a user may identify an object to be viewed. A server may identify a plurality of image arrays (e.g., may identify a 3D data structure that includes the plurality of image arrays). The server may receive a request from a client to view the 3D video of the object from a new viewpoint. The server may identify a camera based on the new viewpoint. The server may identify an image array associated with the camera (e.g., identify the image array generated by the camera). The server may send the images from identified image array to a client (e.g., a client device and/or a media viewer operating on a client device). In another embodiment, the server may identify cameras around the new viewpoint and may identify images arrays associated with the cameras. The server may send images from the identified image arrays to the client device so that the client device can cache those images.

In one embodiment, the server may also generate a 3D mesh (e.g., a 3D model) of the object in the 3D video, based on the plurality of image arrays. In another embodiment, the server may provide a media viewer for viewing the 3D video of the object. The media viewer may include a graphical user interface that allows a user to control playback of the 3D video and to switch between different viewpoints of the object. The graphical user interface may also include previews of the object from different viewpoints.

In additional embodiments, computing devices for performing the operations of the above described embodiments are also implemented. Additionally, in embodiments of the disclosure, a computer readable storage media may store instructions for performing the operations of the embodiments described herein.

The above summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

System and methods for generating a 3D video of an object and providing the 3D video of the object to a client are provided. Multiple cameras positioned around the object may capture sequences or arrays of images of the object. Each of the cameras may provide images of the object from a different viewpoint or vantage point. A server may process the arrays of images and generate a 3D video of the object. The 3D video may allow a user to view a video of the object from multiple viewpoints. The user may switch between the different viewpoints during playback of the video.

A user may use a media viewer to view the 3D video. The media viewer may include a graphical user interface that allows a user to control playback of the 3D video. The media viewer also allows the user to change from one viewpoint to another viewpoint during playback of the 3D video. The media viewer may also include previews of preselected viewpoints of the object.

The 3D video may allow merchants, vendors, and/or services providers to provide users with a more detailed view of the object because the 3D video allows the user to view the video of the object from a different viewpoint. This may allow a user to see how an object may behave and/or operate from different viewpoints and may assist the user in determining whether to purchase a product and/or service.

Figure 1:
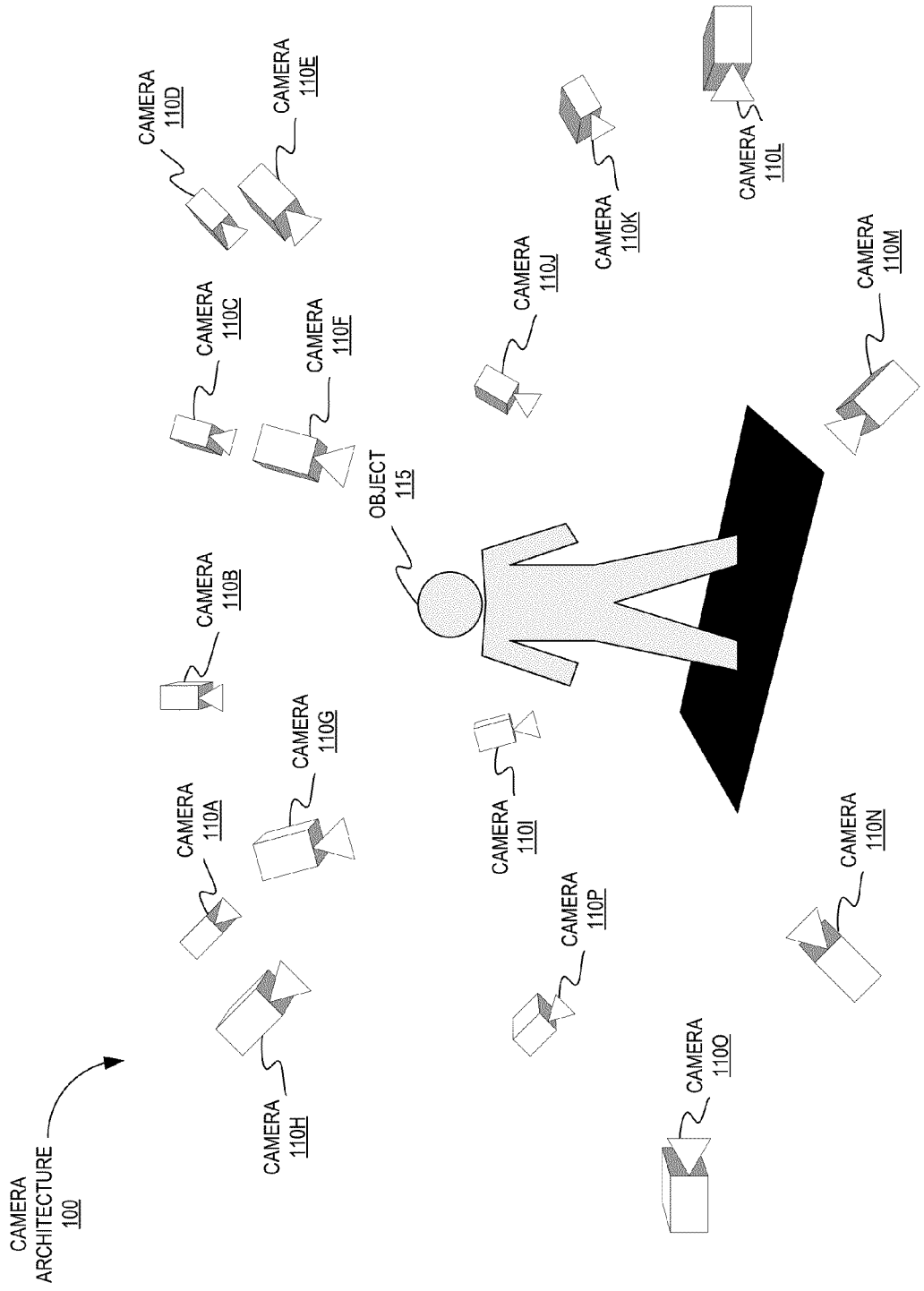
FIG. 1 is a block diagram illustrating an example camera architecture, in accordance with one embodiment of the present disclosure.

FIG. 1 is a block diagram illustrating an example camera architecture 100, in accordance with one embodiment of the present disclosure. The camera architecture 100 includes cameras 110A through 110P and an object 115. The cameras 110A through 110P are positioned around object 115 in a semi-spherical layout or semi-spherical shape. For example, the cameras 110A through 110P form a semi-sphere with the object 115 in a central region of the semi-sphere. Cameras 110A through 110H form a circle above the object 115. Cameras 110I through 110P form a circle at approximately the same elevation of the object 115. Each of the cameras 110A through 110P is located at a position which provides each camera 110A through 110P with a particular viewpoint of the object 115. For example, camera 110P is located in a position that has a front side viewpoint of the object 115. In another example, camera 110E is located in a position that has a rear side elevated viewpoint of the object 115. In a further example, the camera 110C has a right side elevated viewpoint of the object 115. Although one object 115 is illustrated in FIG. 1, it should be understood that in other embodiments, object 115 may include multiple objects. For example, the object 115 may include a person (e.g., a first object) that is wearing an article of clothing, such as a dress or a skirt (e.g., a second object).

Although sixteen cameras (e.g., cameras 110A through 110P) are illustrated in FIG. 1, it should be understood in other embodiments, any number of cameras may be included in the camera architecture 100. For example, the camera architecture 100 may include fifty cameras or one hundred cameras. In other embodiments, the positions of the cameras (and thus the viewpoints of the object 115 for the cameras) may vary. For example, the cameras may be positioned in multiple concentric circles and each of the concentric circles may be positioned at a different elevation, may have a different number of cameras, and may be of different sizes (e.g., the circles may have different diameters). The cameras may also be arranged around the object 115 in a variety of different layouts and/or positions.

The cameras 110A through 110P may be cameras that are capable of capturing and/or generating (e.g., taking) images (e.g., pictures) and/or videos (e.g., a sequence of images) of the object 115. In one embodiment, the cameras 110A through 110P may be high speed cameras that capture images of the object 115 at a high speed and/or rate. For example, the cameras 110A through 110P may capture multiple images of the object 115 at a rate of one hundred images or frames per second. In another example, the cameras 110A through 110P may capture images of the object 115 at a rate of thirty images or frames per second. In another embodiment, the cameras 110A through 110P may be video cameras that capture video of the object at certain frame rate. For example, the cameras 110A through 110P may capture images at a frame rate of thirty frames per second (FPS). The cameras 110A through 110P may be digital cameras or may be film cameras (e.g., cameras that capture images and/or video on physical film). The images and/or videos captured and/or generated by the cameras 110A through 110P may also be referred to as image arrays or arrays of images. The images and/or videos captured and/or generated by the cameras 110A through 110P may be in a variety of formats including, but not limited to, moving picture experts group format, MPEG-4 (MP4) format, DivX® format, Flash® format, a QuickTime® format, an audio visual interleave (AVI) format, a Windows Media Video (WMV) format, a hypertext markup language-5 (HTML5) format, a Joint Picture Experts Group (JPEG) format, a bitmap (BMP) format, a graphics interchange format (GIF), a Portable Network Graphics (PNG) format, etc.

In one embodiment, the operation of the cameras 110A through 110P may be synchronized with each other and the cameras 110A through 110P may capture images and/or videos of the object 115 in a synchronized or coordinated manner. For example, each of the cameras 110A through 110P may capture images and/or videos at a rate of thirty frames/images per second. Each of the cameras 110A through 110P may capture the images and/or videos of the object 115 at the same (or substantially the same) point in time. For example, if the cameras 110A through 110P start capturing images at the same time (e.g., time T or at zero seconds), the cameras 110A through 110P may each capture a first image of the object 115 at time T+1 (e.g., at ⅓₀ of a second), a second image of the object 115 at time T+2 (e.g., at ⅔₀ of a second), a third image of the object 115 at time T+3 (e.g., at ³⁄₃₀ of a second), etc. In one embodiment, the cameras 110A through 110P may be synchronized with each other but may not capture images and/or video at the same point in time. For example, the time that each camera captures an image may be spaced apart (e.g., staggered) such that camera 110A may capture a first image of the object 115 at Time T+1 (e.g., at ⅓₀ of a second), camera 110B may capture a second image of the object 115 at time T+2 (e.g., at ⅔₀ of a second), camera 110C may capture a third image of the object 115 at time T+3 (e.g., at ³⁄₃₀ of a second), etc.

The images (e.g., arrays of images or image arrays) and/or videos capture by one or more of the cameras 110A through 110P may be stored in a data store such as memory (e.g., random access memory), a disk drive (e.g., a hard disk drive or a flash disk drive), and/or a database (as discussed below in conjunction with FIGS. 2-5). In one embodiment, the images and/or videos captured by the cameras 110A through 110P may be stored and/or organized in a 3D data structure (as discussed below in conjunction with FIG. 4).

In one embodiment, each of the images in the image array may include data indicative of a time within the 3D video. For example, if the cameras captured images at a rate of ten images per second, and the cameras captured images for ten seconds, then each image array would include one hundred images. The 3D video generated from the image arrays would be ten seconds long. Each image in an image array may have a timestamp indicating when the image may be displayed within the ten seconds of the 3D video. For example, the first image in an image array may have a timestamp of 0.1 seconds (e.g., a timestamp of 0:00.1), the tenth image in an image array may have a timestamp of 1 second (e.g., a timestamp of 0:01), the thirty-seventh image in an array may have a timestamp of 3.7 seconds (e.g., a timestamp of 0:03.7), etc. The timestamps of images in the multiple image arrays may be synchronized. For example, the first image in each of the image arrays may include a timestamp of 0.1 seconds, the second image in each of the image arrays may include a timestamp of 0.2 seconds, the third image in each of the image arrays may include a timestamp of 0.3 seconds, etc.

In one embodiment, the images and/or videos may be processed and/or analyzed by a computing devices (such as a media server illustrated in FIG. 3) to generate or obtain a 3D video of the object 115 based on the 3D data structure. The 3D video may allow a user to view the object 115 from any of the viewpoints of the cameras 110A through 110P. For example, the 3D video may allow the user to view the object 115 from the viewpoint of camera 110M. The 3D video may also allow the user to switch between different viewpoints (e.g., switch between different cameras 110A through 110P) as the user views the 3D video of the object 115. For example, the user may watch the 3D video of the object 115 from the viewpoint of camera 110C and may switch to the viewpoint of camera 110D, then to the viewpoint of camera 110E, and then to the viewpoint of camera 110L.

In another embodiment, the images and/or videos may be processed and/or analyzed by a computing devices (such as a media server illustrated in FIG. 3) to generate or obtain a 3D mesh of the object 115. A 3D mesh may be a collection of vertices, edges and faces (e.g., polygonal shapes or surfaces) that define the shape and/or boundary of an object. The faces may consist of various polygonal shapes such as triangles, quadrilaterals, simple convex polygons, concave polygons, and/or polygons with holes. A 3D mesh may also be referred to as a 3D model. The 3D mesh of the object 115 may allow a user to virtually interact with the object 115. For example, the 3D mesh may be used by a user to rotate a virtual representation of the object 115 (e.g., a 3D object and/or a virtual object) and interact virtually with the object 115. In another example, the 3D mesh of the object 115 may be used to allow users to see how the object 115 may behave (e.g., how the object may move) in the real world with the laws of physics applied. In other embodiments, any algorithm, function, operation, or method may be used to generate the 3D mesh. These algorithms, functions, operations, or methods may include, but are not limited to, Delaunay triangulation, Fortune's algorithm, Ruppert's algorithm, tessellation, the stretched grid method, etc.

The 3D video may be used by vendors, merchants, and/or services providers to provide more detailed videos of products (e.g., objects) and/or services sold by the vendors, merchants, and/or service providers. For example, the 3D video may allow a user to view a video of a model walking while wearing a jacket, from multiple viewpoints. This may allow the user to see how the jacket looks from the front, back, left, and right sides while the model walks around. The user may be able to better determine the look, feel, and/or other properties of the jacket by viewing the 3D video from different viewpoints. In another example, the 3D video may be used to provide better demonstrations of a product and/or service by allowing a user to view the demonstration from multiple viewpoints. In a further example, the 3D video may be used to provide tutorials on how to perform an action. For example, the 3D video may be used to provide a tutorial on how to assemble an item sold by a vendor. The user may view the assembly of the item from multiple viewpoints an may be able to better understand how to assemble the product because the user may be able to view the assembly of the item from a viewpoint that might have been obscured if a standard video with only one viewpoint was used.

Figure 2:
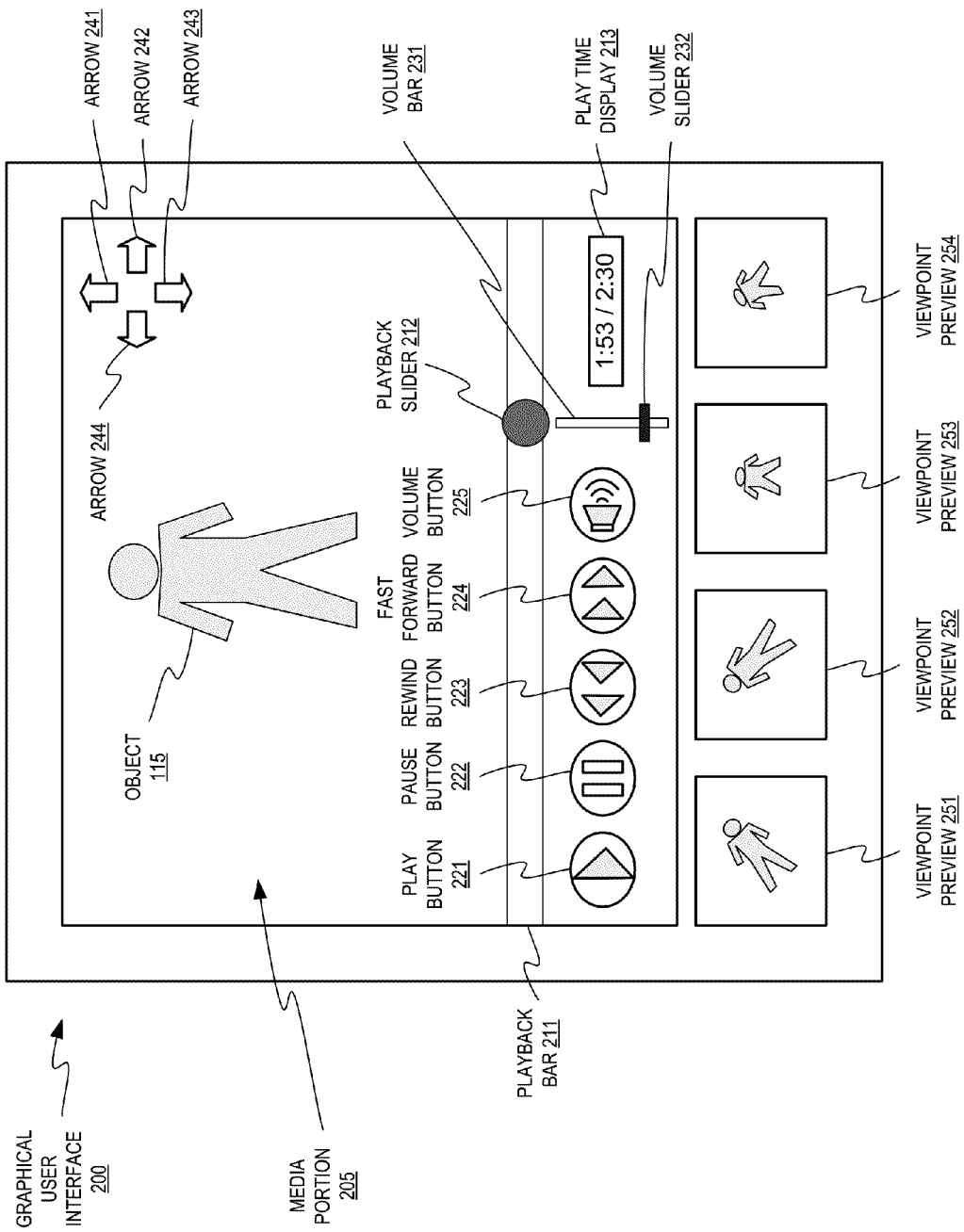
FIG. 2 is a diagram illustrating an example graphical user interface (GUI) in accordance with one embodiment of the present disclosure.

FIG. 2 is a diagram illustrating an example graphical user interface (GUI) 200 in accordance with one embodiment of the present disclosure. In one embodiment, the GUI 200 may be part of a media viewer provided by a media server (e.g., media server as illustrated and discussed below in conjunction with FIG. 3). For example, the GUI 200 may be part of a media viewer that is embedded in a web page (e.g., an embedded media viewer such as a Flash® player or a hypertext markup language-5 (HTML5) player) and the GUI 200 may be rendered by a web browser executing on a client device. In another embodiment, the GUI 200 may be part of a media viewer that may be separate from a web page (e.g., may be a standalone media viewer). For example, the media viewer may be a separate application that is executing on the client device.

The GUI 200 includes a media portion 205 that may display a 3D video of the object 115. For example, media portion 205 may be the portion of the GUI 200 where the 3D video is played. The media portion 205 may also play other types of videos, images, music, and/or other media items. The media portion 205 also includes arrows 241 through 244. The arrows 241 through 244 may allow a user to move from one viewpoint to another viewpoint while the user is viewing the 3D video of the object 115. For example, referring back to FIG. 1, the arrow 241 (e.g., an up arrow) may allow a user to move from the viewpoint of camera 110N to the viewpoint of camera 110G. In another example, referring back to FIG. 1, the arrow 244 (e.g., a left arrow) may allow a user to move from the viewpoint of camera 110L to the viewpoint of camera 110M. In one embodiment, the arrows 241 through 244 may be located in other regions or portions of the GUI 200 (e.g., may not be located in the media portion 205). In one embodiment, the media viewer may send a message and/or a request to the media server when the user activates, clicks, and/or selects one of the arrows 241 through 244. The message and/or request may include data indicative of a different viewpoint from which the user may want to view the 3D video of the object 115. In one embodiment (not shown in the figures), the GUI 200 may also include buttons (e.g., magnifying glass buttons) that allow a user to zoom in and/or zoom out during the playback of the 3D video. This may allow a user to get a closer view and/or a farther view of the object 115.

In another embodiment, the user may change the viewpoint of the 3D video by clicking (e.g., using a mouse, touchpad, touchscreen, or other input device) on a location within the media portion 205. The media viewer may send a message and/or request that includes data indicative of the location where the user clicked to the media server and the media server may identify a different viewpoint based on the location. For example, referring back to FIG. 1, if the user clicks on a location that is near where camera 110K is located, the media viewer may send a message and/or request indicating the location and the media server may provide the images generated by camera 110K to the media viewer. The media viewer may switch the viewpoint of the 3D video and display the images and/or video generated by camera 110K in the media portion 205. In a further embodiment, the user may change the viewpoint of the 3D video of the object 115 by clicking and holding (e.g., clicking and holding a button on a mouse, or by clicking on a portion of the media portion 205 and dragging towards a different direction (e.g., clicking and dragging towards the left). The GUI 200 may continue playing the 3D video of the object 115 from the new viewpoint selected by the user. For example, a server may provide the media player with images from a new image array associated with the new viewpoint. The images from the new image array may have a timestamp that is later than the point in time in the 3D video when the user selected the new viewpoint. For example, if the user is watching the 3D video and selects a new viewpoint at time 0:15 within the 3D video (e.g., after 15 seconds of playing the 3D video) the server may provide images from the image array associated with the new viewpoint and each of the images may have a timestamp that is later (e.g., greater) than or equal to 0:15.

The GUI 200 also includes media viewer controls which may be used to control the playback/display of the 3D video (of the object 115) or of other media items (e.g., other digital videos or digital music). The media viewer controls include a play button 221, a pause button 222, a rewind button 223, a fast forward button 224, and a volume button 225. The play button 221 may allow a user to begin and/or restart playback of the 3D video. The pause button may allow a user to pause and/or un-pause playback of the 3D video. The rewind button 223 may allow a user to rewind playback, move and/or skip to an earlier point in time in the 3D video. The fast forward button 224 may allow a user to fast forward playback, move, and/or skip to a later point in time in the 3D video. The GUI 200 also includes a play time display 213, a playback bar 211 and a playback slider 212. The play time display 213 may display a current play time and/or a total play time for the 3D video. For example, a total play time (e.g., the total length) of the 3D video may be 2 minutes and 30 seconds (e.g., 2:30). The current play time may be current time/position in the playback of digital media item (e.g., 1 minute and 53 seconds or 1:53). Playback slider 212 is positioned on a region of a playback bar 211 that corresponds to the current play time (e.g., 1:53). The playback slider 212 may be adjusted (e.g., dragged) to any other region of the playback bar 211 to adjust the current play time shown in the play time display 213.

The volume button 225 may allow user to control the volume of sounds, music, and/or other audible noises in the 3D video. In one embodiment, the volume bar 231 and the volume slider 232 may be displayed when the user clicks and/or activates the volume button 225. For example, the volume bar 231 and the volume slider 232 may not be initially displayed in the GUI 200. After the user clicks the volume button 225, the volume bar 231 and the volume slider 232 may be displayed. The user may move and/or slide the volume slider 232 up and/or down along the volume bar 231 to control the volume of sounds, music, and/or other audible noises in the 3D video. For example, the user may slide the volume slider 232 up to increase the volume or may slide volume slider 232 down to decrease the volume.

The GUI 200 also includes viewpoint previews 251 through 254. The viewpoint previews 251 through 254 may provide a preview the 3D video of the object 115 from different viewpoints. In one embodiment, referring back to FIG. 1, each of viewpoint previews 251, 252, 253, and 254 may be associated with a different one of the cameras 110A through 110P and may be associated with an image array generated by the corresponding one of the cameras 110A through 110P. For example, viewpoint preview 251 may be associated with camera 110F and may be associated with an image array generated by camera 110F. A user may select, activate, and/or click on one of the viewpoint previews 251 through 254. When the user selects, activates and/or clicks on one of the viewpoint previews 251 through 254, the media portion 205 may display a 3D video of the object 115 from the viewpoint of the camera associated with the viewpoint preview indicated by the user. For example, referring back to FIG. 1, viewpoint preview 251 may be associated with camera 110F. When the user selects, activates and/or clicks the viewpoint preview 251, the media portion 205 may display the 3D video of the object 115 from the viewpoint of camera 110F (e.g., the media portion may display the images and/or video generated by the camera 110F).

In one embodiment, one or more of the viewpoint previews 251 through 254 may be identified by a server (e.g., a media server). For example, a media server may identify one or more default viewpoints and/or default cameras (e.g., may identify cameras 110P, 110L, 110J, and 110N and/or their associated viewpoints). The viewpoints identified by the media server may be common or typical viewpoints that a user may use to view the 3D video of the object. For example, common or typical viewpoints of the object 115 may include a left viewpoint, a right viewpoint, a front viewpoint, a back viewpoint, an overhead or top viewpoint, etc. In another embodiment, one or more of the viewpoint previews 251 through 254 may be viewpoints and/or cameras selected by a user. For example, a user may identify a top left viewpoint and/or camera and the viewpoint preview 251 may be associated with the top left viewpoint and/or camera. In further embodiments, the view point previews 251 through 254 may include both viewpoints identified by the media server and viewpoints selected and/or identified by a user.

In one embodiment, the viewpoint previews 251 through 254 may be images obtained from the image arrays received from cameras associated with the viewpoints. For example, referring back to FIG. 1, viewpoint preview 251 may be associated with camera 110F and the viewpoint preview 251 may be an image from the image array generated by the camera 110F. In another embodiment, the viewpoint previews 251 through 254 may be videos (e.g., a sequence or array of images) of the object 115 generated by cameras associated with the viewpoints in the viewpoint previews 251 through 254. For example, referring back to FIG. 1, viewpoint preview 251 may be associated with camera 110F and the viewpoint preview 251 may be a video (e.g., a sequence or array of images) of the object 115 generated by the camera 110F. The videos displayed in the viewpoint previews 251 through 254 have a lower quality (e.g., a lower bit rate) and/or a lower resolution than the video of the object 115 obtained by the camera associated with the viewpoint previews 251. For example, referring back to FIG. 1, viewpoint preview 252 may be associated with camera 110G and the viewpoint preview 251 may be lower resolution and/or lower quality (e.g., lower size or lower bit rate) version of the images and/or video generated by camera 110G. In one embodiment, videos for the viewpoint previews 251 through 254 (e.g., the lower quality and/or lower resolution videos) may be synchronized in time with the playback of the 3D video in the media portion 205. For example, the media portion 205 may play the 3D video of the object 115 from a first viewpoint and the 3D video may show a person swinging a golf club. The videos that are displayed or played in the viewpoint previews 251 through 254 may be videos of the object 115 from other viewpoints and may also show the person swinging the golf club from different viewpoints associated with the viewpoint previews 251 through 254.

In one embodiment, the media viewer may cache one or more images and/or portions of videos generated by the cameras associated with the viewpoint previews 251 through 254. For example, referring back to FIG. 1, if viewpoint preview 251 is associated with the camera 110P, the media viewer may request images and/or portions of the video generated by the camera 110P and may store (e.g., cache) those images in a data store (e.g., a memory, a hard disk, etc.). The media server may provide the requested images and/or portions of the video generated by the camera 110P to the media viewer. When the user selects the viewpoint preview 251, the media play may transition the 3D video of the object 115 to the viewpoint associated with the viewpoint preview 251 by displaying the cached images and/or portions of the video. In another embodiment, the media viewer may cache one or more images and/or portions of videos generated by one or more cameras that are located around the current viewpoint of the object 115 that is displayed in the media portion 205. For example, referring back to FIG. 1, the 3D video of the object 115 displayed in the media portion 205 may be from the viewpoint of the camera 110P. The media server may provide images and/or portions of videos generated by cameras 110O, 110I, 110A, 110H, and 110G.

Figure 3:
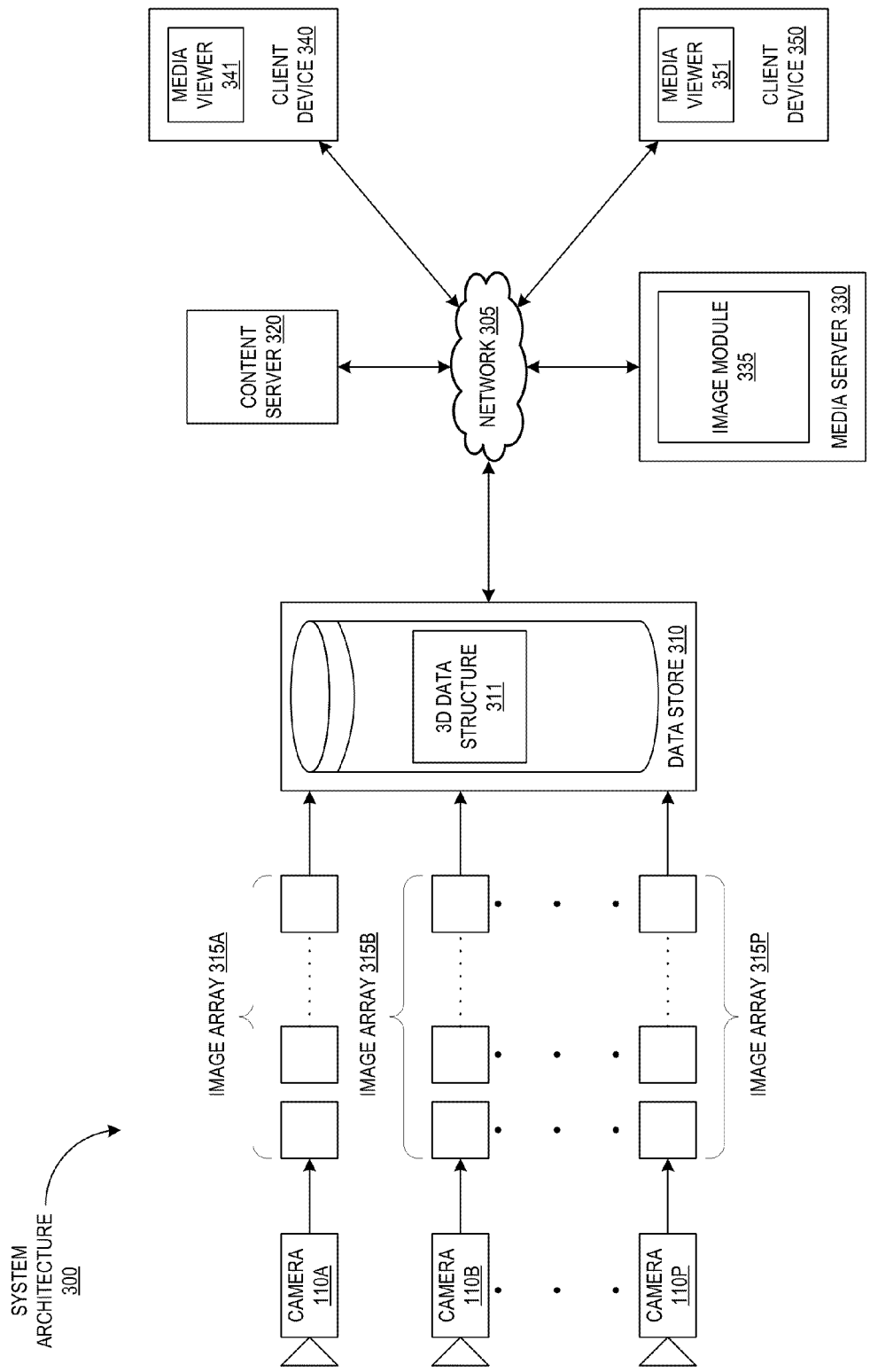
FIG. 3 illustrates an example system architecture, in accordance with one embodiment of the present disclosure.

FIG. 3 illustrates an example system architecture 300, in accordance with one embodiment of the present disclosure. The system architecture 300 includes cameras 110A through 110P, a data store 310, a content server 320, a media server 330, client devices 340 and 350, coupled to a network 305. Network 305 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The cameras 110A through 110P may be part of a camera architecture as illustrated in FIG. 1. The cameras 110A through 110P may be positioned around one or more objects (e.g., object 115 illustrated in FIG. 1) in various layouts and/or positions. For example, the cameras 110A through 110P may form a semi-sphere with the one or more objects in a central region of the semi-sphere. Each of the cameras 110A through 110P may be located at a position that provides each camera 110A through 110P with a particular viewpoint of the object 115. Each of the cameras 110A through 110P may generate image arrays (e.g., a plurality of images or a sequence of images). For example, camera 110A generates image array 315A, camera 110B generates image array 315B, etc. In one embodiment, the image arrays may be considered a video of the one or more objects from the viewpoint of the camera that generated the image array. For example, the image array 315B may be a video of the one or more objects from the viewpoint of camera 110B.

Figure 4:
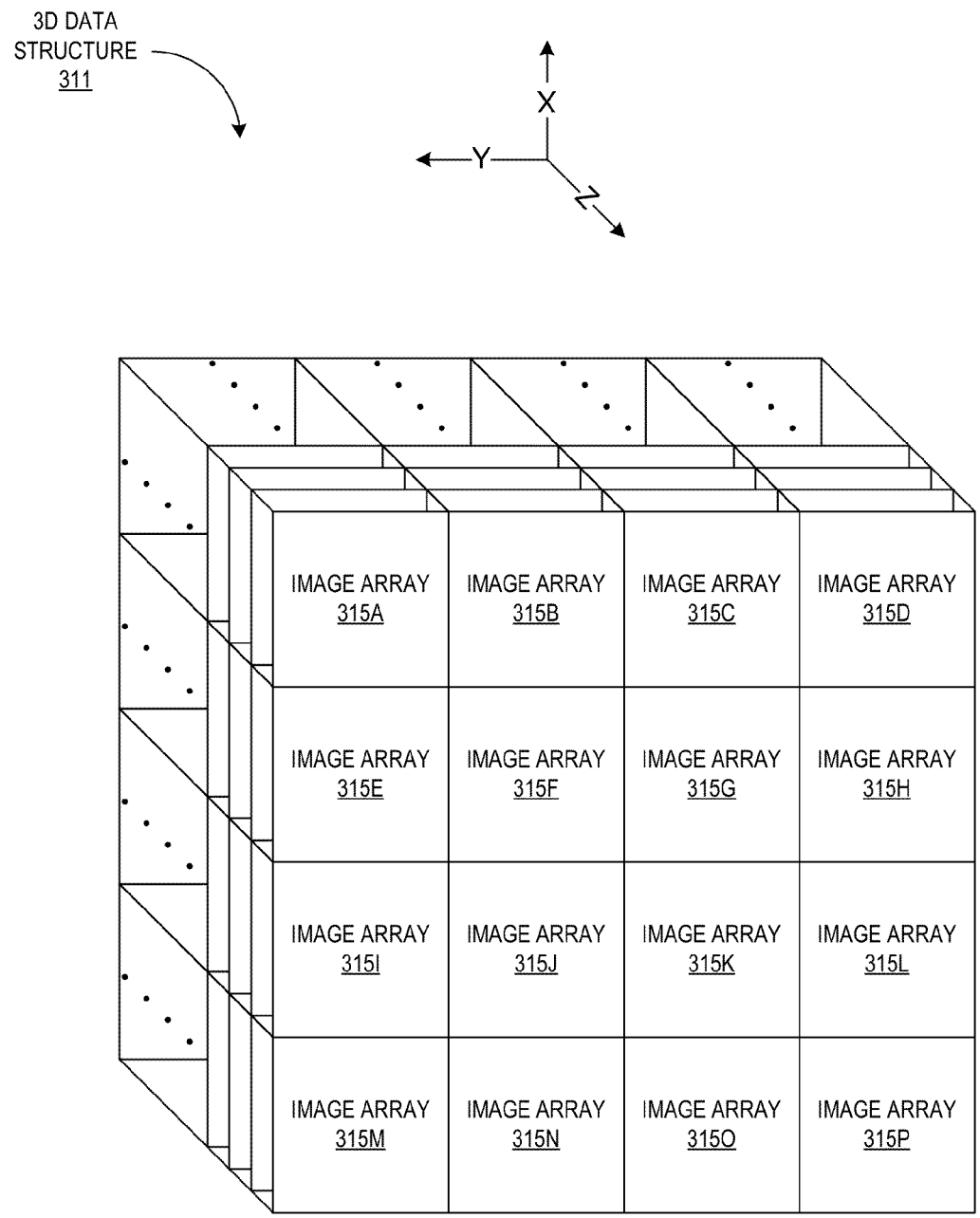
FIG. 4 is a block diagram illustrating an example data structure, in accordance with one embodiment of the present disclosure.

The image arrays 315A through 315P (that are generated by the cameras 110A through 110P) are stored in a data store 310. In one embodiment, the images from the image arrays 315A through 315P may be included in a 3D data structure 311 (as illustrated in FIG. 4 and discussed below in conjunction with FIG. 4). In another embodiment, the image arrays 315A through 315P may be stored separately from each other (e.g., may not be combined with other image arrays). In a further embodiment, the data store 310 may also include multiple 3D data structures or multiple groups of image arrays (not shown in the Figure). For example, the data store 310 may include multiple 3D data structures, each 3D data structure including images arrays of a different object. In another example, the data store 310 may include multiple groups and/or sets of image arrays of different objects. In one embodiment, the data store 310 may be may be a memory (e.g., random access memory), a cache, a drive (e.g., a hard drive), a flash drive, a database system, or another type of component or device capable of storing data. The data store 310 may also include multiple storage components (e.g., multiple drives or multiple databases) that may also span multiple computing devices (e.g., multiple server computers).

The media server 330 may be one or more computing devices such as a rackmount server, a router computer, a server computer, a personal computer, a mainframe computer, a laptop computer, a tablet computer, a desktop computer, etc. The media server 330 includes an image module 335. In one embodiment, the image module 335 may receive requests from client device 340 and/or 350 (e.g., receive requests from the media viewers 341 and/or 351) to play 3D videos of different objects. The image module 335 may receive data indicative of an object from the client device 340 and/or 350. The image module 335 may identify the 3D data structure 311 based on the data indicative of the object. The image module 335 may provide images from one the image arrays in the 3D data structure 311 to the client device 350 and/or 350. The image module 335 may also receive data indicating a different viewpoint from the client device 340 and/or 350. The image module 335 may identify a different image array in the 3D data structure 311 based on the viewpoint and may provide images from the different image array to client device 340 and/or 350. As discussed above, the images from the different image array may have timestamps that are later (e.g., greater) than or equal to the time within the 3D video when the data indicating the different viewpoint was received. In one embodiment, the 3D data structure 311 may be a 3D video of the one or more objects.

In one embodiment, the image module 335 may also provide a media viewer including a GUI to the client device 340 and/or 350. For example, the image module 335 may provide a media viewer that includes the GUI 200 illustrated in FIG. 2. In one embodiment, the image module 335 may provide an embedded media viewer (e.g., a Flash® player or an HTML5 player embedded in a web page) to the client device 340 and/or 350. In another embodiment, the image module 335 may provide a standalone media viewer (e.g., a media player application) to the client device 340 and/or 350. The image module 335 may receive user input from a user via the GUI that is part of the media viewer. For example, the image module 335 may receive user input indicating that the user wants to pause playback of the 3D video. The image module 335 may stop providing images from the 3D data structure 311 based on the user input. In another example, the image module 335 may receive user input (from the media viewer 341 and/or 351) indicating that the user wants to change and/or transition to a different viewpoint in the 3D video. The image module 335 may identify a different image array in the 3D data structure 311 based on the user input and may provide images from the different image array to the media viewer 341 and/or 351.

In one embodiment, the image module 335 may also identify cameras and/or viewpoints around a current viewpoint of the object 115. The image module 335 may provide images from image arrays associated with cameras and/or viewpoints that are around a current viewpoint of the object 115. This may allow a user to cache images of the object 115 from different viewpoints that are around and/or adjacent to the current viewpoint. This may allow the client device to play the 3D video without having to request the images from the image arrays associated with the adjacent viewpoints if the user changes the viewpoint of the 3D video to one of these adjacent viewpoints.

In one embodiment, the image module 335 may generate a 3D mesh of one or more objects in the 3D video based on 3D data structure 311. For example, the images in the image arrays of the 3D data structure 311 may be used to generate a 3D mesh (e.g., a 3D model and/or a 3D object) of one or more of the objects in the 3D video. In one embodiment, the image module 335 may use the 3D mesh of the one or more objects to allow a user to interact with virtual representation (e.g., a 3D object) of one or more objects in the 3D video. For example, the image module 335 may generate a 3D object based on the 3D mesh.

The content server 320 may be one or more computing devices such as a rackmount server, a router computer, a server computer, a personal computer, a mainframe computer, a laptop computer, a tablet computer, a desktop computer, etc. The content server 320 may provide content to client device 340 and/or client device 350. For example, the content server 320 may be a server for an online merchant that allows users to purchase items from the online merchant via an online store hosted by the content server 320. Users may view items on the online store using client device 340 and/or client device 350. In another example, the content server 320 may provide information such as news, articles, tutorials, etc., to the client device 340 and/or client device 350. In a further example, the content server 320 may be a server for a business and/or company that provides products and/or services for sale. The business and/or company may provide information (e.g., product specifications, description of services, videos and/or images of products and/or services, etc.) to customers and/or potential customers.

In one embodiment, the content server 320 may provide 3D videos of one or more objects (that may be generated by the media server 330) to client device 340 and/or 350. For example, the content server 320 may be a server for an online merchant, and the content server 320 may provide a 3D video of a product to client device 340. The user may view the 3D video of the product (e.g., one or more objects) when making a decision to purchase the product. In another example, the content server 320 may be a server that provides videos, such as informational videos and/or tutorial videos (e.g., videos on how to improve a user's golf swing or videos on how to do perform a home repair). In one embodiment, the content server 320 may receive the 3D videos from the data store 310 and/or may receive the 3D videos from the media server 330. In another embodiment, the content server 320 may redirect the client device 340 and/or 350 to the data store 310 and/or the media server 330 to access the 3D videos. For example, the media viewer 341 may be a web browser and the content server 320 may redirect the web browser to a location in the data store 310 and/or the media server 330.

The client devices 340 and 350 may each include computing devices such as personal computers (PCs), laptops, mobile phones, smart phones, tablet computers, netbook computers etc. Client device 340 includes media viewer 341 and client device 350 includes media viewer 351. In one embodiment, the media viewers 341 and/or 351 may be applications that allow users to view content, such as images, videos, web pages, documents, etc. For example, the media viewer 341 may be a web browser that can access, retrieve, present, and/or navigate content (e.g., web pages such as Hyper Text Markup Language (HTML) pages, digital media items, etc.) served by a web server. The media viewer 341 may render, display, and/or present the content (e.g., a web page, a media viewer) to a user. The media viewer 341 may also display an embedded media player (e.g., a Flash® player or an HTML5 player) that is embedded in a web page (e.g., a web page that may provide information about a product sold by an online merchant). In another example, the media viewer 341 and/or 351 may be a standalone application that allows users to view digital media items (e.g., digital videos, digital images, electronic books, etc.). The media viewer 341 and 351 may be provided to the client devices 350 and 340 by the media server 330 and/or content server 320. For example, the media viewer 341 may be an embedded media player that is embedded in a web page provided by the content server 320. In another example, the media viewer 351 may an application that is downloaded from the content server 320.

FIG. 4 is a block diagram illustrating an example 3D data structure 311, in accordance with one embodiment of the present disclosure. The 3D data structure 311 may be stored on a data store (e.g., a memory, a disk, etc.). The 3D data structure 311 may be accessed by one or more servers (e.g., content server 320 and/or media server 330 as illustrated in FIG. 3) to provide a 3D video to media viewers on client devices. In one embodiment, the 3D data structure 311 may be a 3D video of one or more objects. The 3D data structure 311 includes image arrays 315A through 315P. As discussed above, each of the image arrays 315A through 315P may be generated by different cameras (e.g., cameras 110A through 110P as illustrated in FIG. 2). Each of the cameras may be located at a position that provides each camera with a particular viewpoint of the one or more objects in the 3D video. Each of the image arrays 315A through 315P may be plurality of images and/or a sequence of images. In one embodiment, the image arrays may be considered a video of the one or more objects from the viewpoint of the camera that generated the image array. The 3D data structure 311 may be a 3D video of the one or more objects.

As illustrated in FIG. 4, the 3D data structure 311 is arranged such that the image arrays 315A through 315P are arranged in the X-Y plane of the 3D data structure 311. Each image array 315A through 315P includes multiple images (e.g., digital pictures, frames, etc.) and the multiple images are arranged along the Z-axis of the 3D data structure 311. The image arrays 315A through 315P are arranged in sequential order from the left to right and top to bottom of the X-Y plane. For example, the first row of image arrays includes image arrays 315A, 315B, 315C, and 315D, and the second row of image arrays includes image arrays 315E, 315F, 315G, and 315H. In other embodiments, the image arrays may be arranged differently in the 3D data structure 311. As discussed, each of the image arrays 315A through 315P is associated with a camera that has a viewpoint of one or more objects in the 3D video. The image arrays 315A through 315P may be arranged such that the location of the image array within the X-Y plan of the 3D data structure 311 corresponds to the physical location of the cameras around the one or more objects in the 3D video. For example, the image arrays 315A through 315P may be arranged in the X-Y plan of the 3D data structure 311 based on a equi-rectangular projection of the locations of the physical cameras onto a two dimensional plane. In another example, the image arrays 315A through 315P may be arranged in the X-Y plan of the 3D data structure 311 based on a Mercator or a Gauss-Kruger projection of the locations of the physical cameras onto a two dimensional plane.

As discussed above, a user may change the viewpoint of the 3D video (using a GUI, such as GUI 200 illustrated in FIG. 2). When the user changes the viewpoint of the 3D video, a different image array of the 3D data structure 311 may be accessed and images from the different image array may be provided to the media viewer. For example, referring to FIG. 1, the user may be viewing the 3D video from the viewpoint of camera 110K and a server (e.g., content server and/or media server) may provide images from the image array 315K (which corresponds or is associated with the camera 110K). The user may shift to the viewpoint of camera 110D and the server may determine that the image array 315D is associated with the camera 110D and may provide images from the image array 315D to the media viewer.

In one embodiment, the server may access the 3D data structure 311 and may provide images from multiple image arrays to a media viewer (e.g., a user and/or a client device) so that the media viewer may cache the other image arrays. For example, referring back to FIG. 1, if the user is viewing a 3D video of the object 115 from the viewpoint of camera 110A, the server may provide images from the image array 315A to the media viewer. The server may also provide images from other image arrays associated with cameras 110H, 110B, 110I, 110O, and 110P (e.g., image arrays 315H, 315B, 315I, 315O, and 315P, respectively) because these cameras are physically adjacent to the camera 110A and the user may likely change to one of the viewpoints of the cameras 110H, 110B, 110I, 110O, and 110P. The media viewer may cache and/or store these images from the other image arrays. This may allow the client device to play the 3D video more quickly if the user changes the viewpoint of the 3D video to one of these adjacent viewpoints. In another example, referring back to FIG. 2, the server may provide images from image arrays that are associated with viewpoint previews of a GUI for the media viewer. For example, a viewpoint preview in the GUI of the media viewer may be associated with camera 110I and the server may provide images from image array 315I to the media viewer so that the media viewer may cache and/or store the images from the image array 315I.

Figure 5:
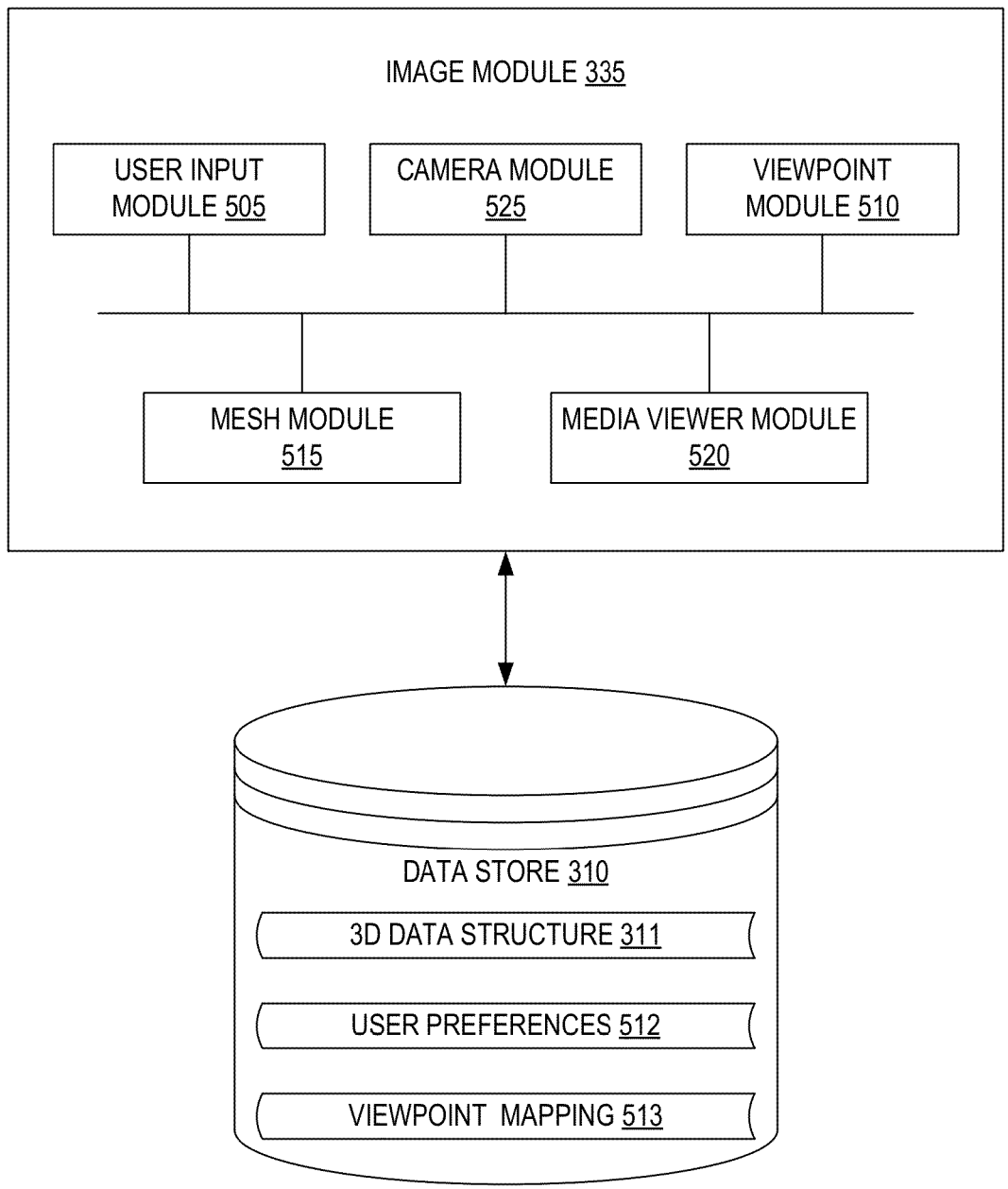
FIG. 5 is a block diagram illustrating an image module, in accordance with one embodiment of the present disclosure.

FIG. 5 is a block diagram illustrating an image module, in accordance with one embodiment of the present disclosure. The image module 335 includes a user input module 505, a viewpoint module 510, a mesh module 515, a media viewer module 520, and a camera module 525. More or less components may be included in the image module 335 without loss of generality. For example, two of the modules may be combined into a single module, or one of the modules may be divided into two or more modules. In one embodiment, one or more of the modules may reside on different computing devices (e.g., different server computers).

The image module 335 is communicatively coupled to the data store 310. For example, the image module 335 may be coupled to the data store 310 via a network (e.g., via network 505 as illustrated in FIG. 3). In another example, the image module 335 may be coupled directly to a server where the image module 335 resides (e.g., may be directly coupled to media server 330). The data store 310 may be a memory (e.g., random access memory), a cache, a drive (e.g., a hard drive), a flash drive, a database system, or another type of component or device capable of storing data. The data store 310 may also include multiple storage components (e.g., multiple drives or multiple databases) that may also span multiple computing devices (e.g., multiple server computers). The data store 310 includes 3D data structure 311, user preferences 512, and viewpoint mapping 513.

The 3D data structure 311 may be a data structure that includes multiple image arrays (as illustrated in FIG. 4) and each of the image arrays may include images of an object from the viewpoint of a camera in a camera architecture (e.g., camera architecture 100 illustrated in FIG. 1). In one embodiment, the 3D data structure may be a 3D video of one or more objects. Although one 3D data structure 311 is illustrated, in other embodiments, the data store 310 may include multiple 3D data structures of different objects (e.g., may include multiple 3D videos of different objects) and each of the multiple 3D data structures may include a plurality of image arrays. The user preferences 512 may include data and/or other information indicating user settings and/or preferences for one or more users when viewing the 3D video. For example, the user preference 512 may include data indicating one or more viewpoints to use for viewpoint previews (e.g., as discussed earlier in FIG. 2) for a first user. In another example, the user preferences 512 may also include data indicating a default volume for the 3D video for a second user. In one embodiment, the user preferences 512 may include user settings and/or preference for each user and/or for each 3D video.

The viewpoint mapping 513 may include a mapping of different viewpoints and/or camera to the image arrays in the 3D data structure 311. For example, referring back to FIGS. 3 and 4, the viewpoint mapping 513 may indicate that the viewpoint for camera 110A is associated with image array 315A in the 3D data structure 311 and that the camera 110A is associated with the image array 315A in the 3D data structure 311. In another example, referring back to FIGS. 3 and 4, the viewpoint mapping 513 may indicate that the viewpoint for camera 110P is associated with image array 315P in the 3D data structure 311 and that the camera 110P is associated with the image array 315P in the 3D data structure 311. The image module 335 may use the viewpoint mapping 513 when identifying images to provide to a user (e.g., a client device and/or a media viewer). For example, a user may provide input indicating a new viewpoint and the image module 335 may use the viewpoint mapping 513 to identify the image array associated with the new viewpoint and may provide the images from the image array to the user (e.g., to a client device and/or a media viewer). In one embodiment, each 3D data structure (e.g., each 3D video) may have a different viewpoint mapping.

In one embodiment, the media viewer module 520 may provide a media viewer to a client device (e.g., client device 340 illustrated in FIG. 3). For example, the media viewer module 520 may provide an install file, a software component/module, a binary file, etc., to the client device and the client device may install the media viewer on the client device. IN another example, the media viewer module 520 may provide a web page including an embedded media viewer (e.g., a Flash® player, an HTML5 player, etc.) to a client. The client device may use the embedded media viewer to view the 3D video of the object by accessing the web page.

In one embodiment, the user input module 505 may receive user input from a client device (e.g., from a media viewer on the client device). For example, a user may provide user input via the GUI of the media viewer on the client device indicating that the user wants to change to a different viewpoint of the object in the 3D video. The user input module 505 may receive the user input from the client device and the image module 335 may provide images from the image array associated with the different viewpoint to the client device based on the user input. In another example, the user may provide user input selecting and/or identifying one 3D video from multiple 3D videos. The user input module 505 may process the user input and the image module 335 may provide images from the selected and/or identified 3D video to the client device (e.g., to the media viewer on the client device). In a further example, the user may provide user input indicating the selection of a viewpoint preview. The user input module 505 may receive the user input from the client device and may provide images from the image array associated with the viewpoint preview to the client device.

In one embodiment, the viewpoint module 510 may identify a viewpoint of an object in the 3D video based on user input and may provide images from an image array associated with the viewpoint. For example, when a user initially views a 3D video, the viewpoint module 510 may identify an initial viewpoint and/or a user preferred viewpoint (e.g., by accessing user preferences 512). The viewpoint module 510 may provide images from the image array associated with the initial viewpoint and/or the user preferred viewpoint to the client device. In another example, the viewpoint module 510 may process user input received form a client device to determine whether the user has selected a new viewpoint (e.g., user has used arrows in a GUI and/or used a viewpoint preview to select a new viewpoint). Based on the user input, the viewpoint module 510 may access the viewpoint mapping 513 stored in the data store 310. The viewpoint module 510 may identify the image array associated with the new viewpoint and may provide images from the image array to the client device. In one embodiment, the viewpoint module 510 may determine the time within the 3D video when the user input (indicating a user request to change viewpoints) was received. The viewpoint module 510 may provide images from the new image array (associated with the new viewpoint) and each of the images may have a timestamp that is later (e.g., greater) than or equal to the time within the 3D video when the user input (indicating a user request to change viewpoints) was received. For example, if the user is watching the 3D video and selects a new viewpoint at time 1:56 within the 3D video (e.g., after one minute and fifty-six seconds of playing the 3D video) the server may provide images from the image array associated with the new viewpoint and each of the images may have a timestamp that is later (e.g., greater) than or equal to 1:56.

In another embodiment, the viewpoint module 510 may provide images from multiple image arrays to a client device to allow the client device to cache and/or store the images from the multiple images arrays. For example, the viewpoint module 510 may provide images from a first image array that is associated with a viewpoint selected by the user. The viewpoint module 510 may also provide images from image arrays that have viewpoints that are around and/or adjacent to the viewpoint selected by the user. For example, referring to FIG. 1m the viewpoint module 510 may provide images from the image array associated with camera 110H and the viewpoint of camera 110H. The viewpoint module may also provide images from the image arrays associated with cameras 110G and 110A. In another example, the viewpoint module 510 may provide images from image arrays that are associated with viewpoint previews in the GUI of the media viewer. For example, referring to FIG. 2, the viewpoint module 510 may provide images from image arrays associated with the viewpoint previews 251, 252, 253, and 254, to the client device.

In one embodiment, the mesh module 515 may generate a 3D mesh (e.g., 3D model and/or a 3D object) of one or more objects in a 3D video, based on the 3D data structure 311. For example, the mesh module 515 may analyze one or more images from the image arrays of the 3D data structure 311 and may generate a 3D mesh based on the one or more images. The mesh module 515 may provide the 3D mesh to other computing devices and/or may use the 3D mesh to allow a user to interact with the 3D mesh (e.g., the 3D model and/or 3D object). For example, the object in a 3D video may be a dress that is sold by an online merchant. The mesh module 515 may analyze the images in the 3D data structure 311 (which includes images of the dress) and may generate a 3D mesh of the dress. The mesh module 515 may allow a user to interact with the 3D mesh. For example, the mesh module 515 may allow a user to shine a virtual light on the 3D mesh to simulate the reflective properties/qualities of the dress. In another example, the mesh module 515 may allow the user to blow virtual wind at the dress to simulate the movement of the dress. In a further example, the mesh module 515 may allow the user to simulate pulling on the dress to simulate the flexibility of the material of the dress.

In one embodiment, the camera module 525 may communicate with cameras from a camera architecture (as illustrated in FIG. 1). The camera module 525 may receives image arrays (e.g., sequences of images) from the cameras in the camera architecture and may store the image arrays in the data store 310. For example, referring back to FIGS. 1 and 2, the camera module 525 may receive images (e.g., image arrays) generated by the cameras 110A through 110P. In one embodiment, the camera module 525 may combine the image arrays into 3D data structure 311 (as illustrated in FIG. 4) and may store the 3D data structure 311 in data store 310. In another embodiment, the camera module 525 may store each of the image arrays separately (e.g., without combining the images arrays into a data structure) in the data store 310.

Figure 6:
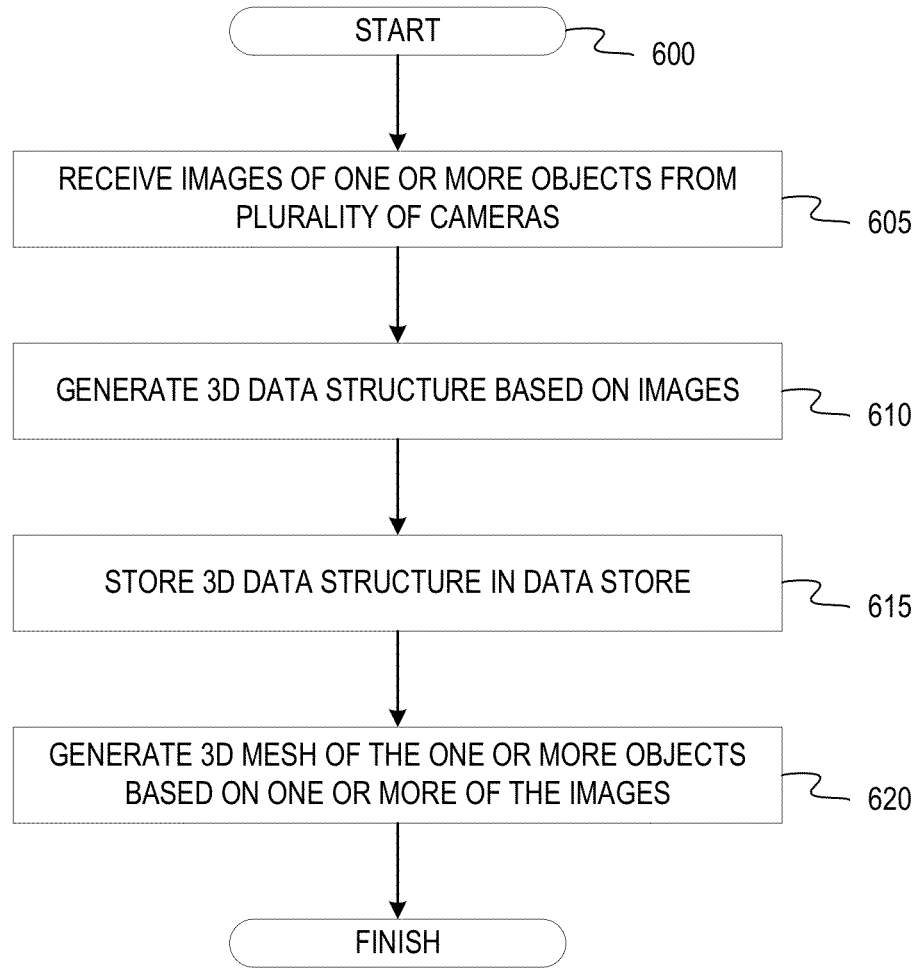
FIG. 6 is a flow diagram illustrating a method of generating a 3D video of one or more objects, in accordance with one embodiment of the present disclosure.
Figure 7:
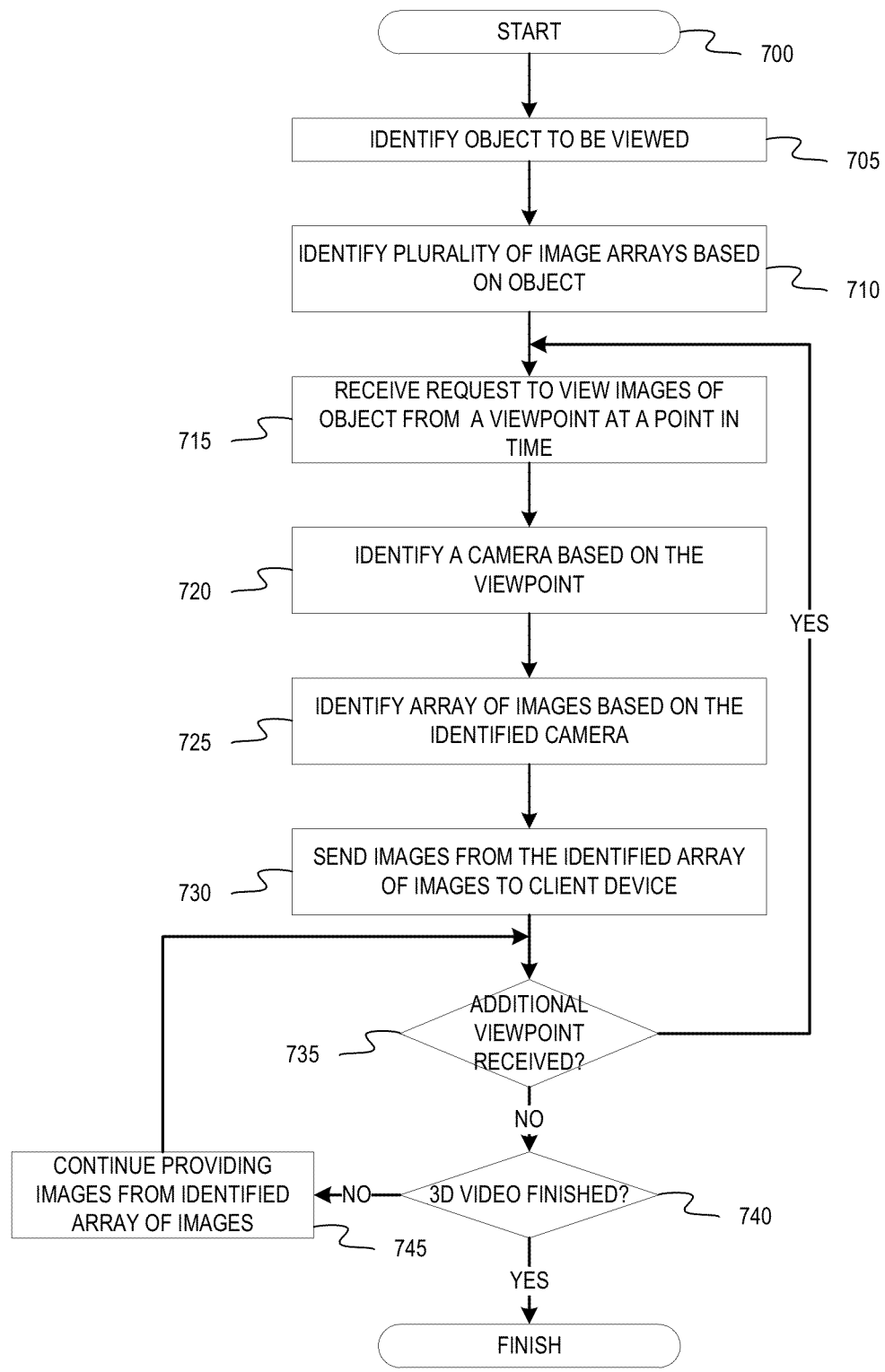
FIG. 7 is a flow diagram illustrating a method of providing a 3D video, in accordance with one embodiment of the present disclosure.
Figure 8:
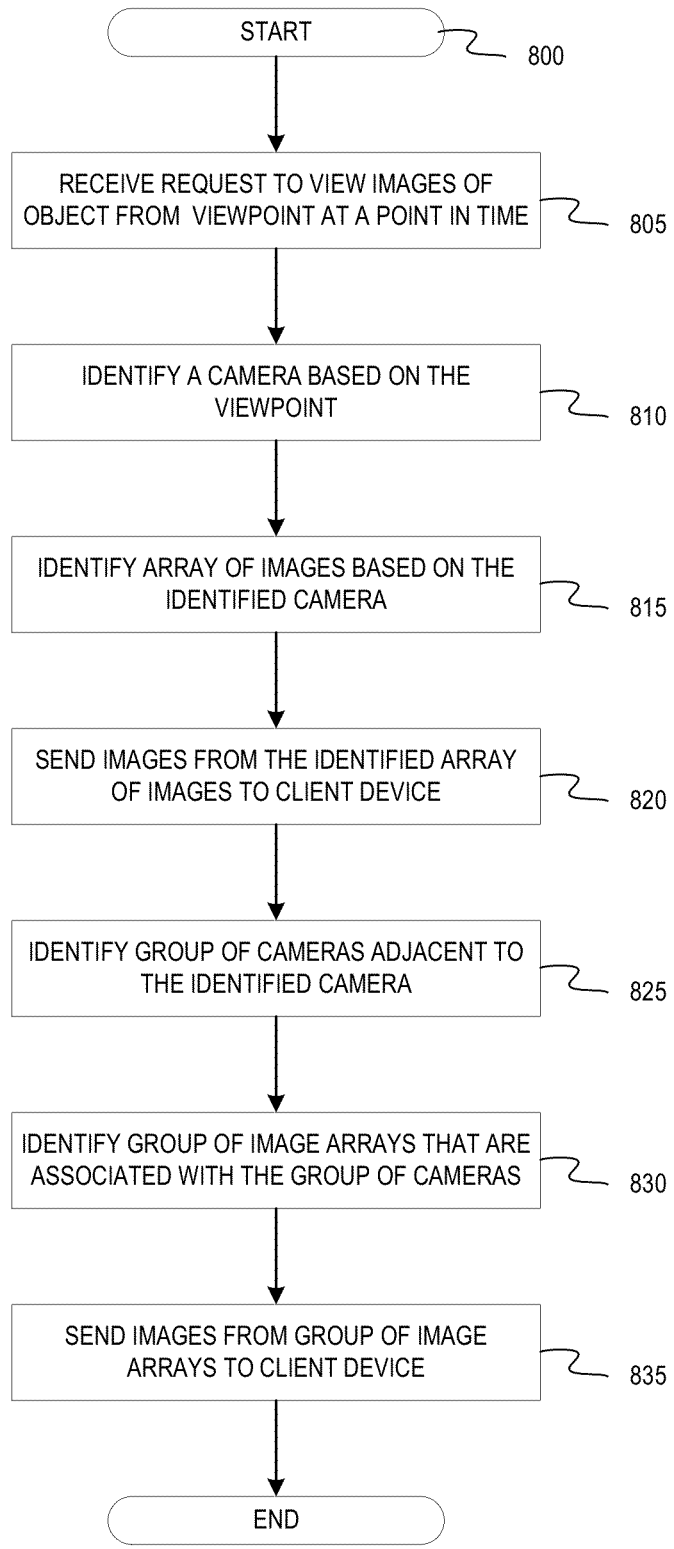
FIG. 8 is a flow diagram illustrating a method of providing a 3D video, in accordance with another embodiment of the present disclosure.

FIGS. 6-8 are flow diagrams illustrating methods of generating 3D videos and providing 3D videos to clients (e.g., client devices). For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 6 is a flow diagram illustrating a method 600 of generating a 3D video of one or more objects, in accordance with one embodiment of the present disclosure. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by an image module, as illustrated in FIGS. 2 and 5.

Referring to FIG. 6, the method 600 begins at block 605 where the method 600 receives images of one or more objects from a plurality of cameras. For example, referring back to FIG. 2, the method 600 may receive an image array (e.g., sequences of images) from each of the cameras 110A through 110P. The method 600 generates a 3D data structure based on the images at block 610. For example, referring back to FIG. 4, the method 600 may combine the image arrays into a 3D data structure. The method stores the 3D data structure in a data store (e.g., a memory, a disk, a database, etc.) at block 615. At block 620, the method 600 may generate a 3D mesh of the one or more objects based on the images (e.g., based on the image arrays and/or the 3D data structure).

FIG. 7 is a flow diagram illustrating a method 700 of providing a 3D video, in accordance with one embodiment of the present disclosure. The method 700 may be performed by processing logic that comprises hardware (e.g., circuitry, dedicated logic, programmable logic, microcode, etc.), software (e.g., instructions run on a processor to perform hardware simulation), or a combination thereof. In one embodiment, method 700 may be performed by an image module, as illustrated in FIGS. 2 and 5.

Referring to FIG. 7, the method 700 begins at block 705 where the method 700 identifies an object to be viewed by a user. For example, the method 700 may receive user input indicating that a user wants to view a 3D video of a particular object. At block 710, the method 700 identifies a plurality of images arrays (e.g., a 3D data structure) based on the object. For example, the method 700 may determine which a 3D data structure includes images of the object identified by the user.

At block 715, the method 700 receives a request to view images of the object from a viewpoint at a point in time. The method 700 identifies a camera based on the viewpoint at block 720. For example, referring back to FIG. 3, the method 700 may identify camera 110B based on the viewpoint selected by a user. The method 700 identifies an array of images based on the identified camera (block 725). For example, referring back to FIG. 3, the method 700 may identify image array 315B based on identifying camera 110B. At block 730 the method 700 sends images from the identified image array to a client device. As discussed above, the images may have a timestamp that is later (e.g., greater) than or equal to the point in time when the request to view the object from the viewpoint was received.

At block 735, the method 700 determines whether additional viewpoints have been received from a client device (e.g., from a user via a GUI of media viewer on the client device). For example, the method 700 may determine whether additional user input indicating a new viewpoint has been received. If an additional viewpoint (e.g., additional user input indicating an additional viewpoint) has been received, the method 700 moves back to block 715. If no additional viewpoints have been received, the method 700 moves to block 740 where the method 700 determines whether the 3D video is finished playing. If the 3D video is not finished playing, the method 700 continues providing images from the array of images identified in block 725 at block 745. If the 3D video is finished playing, the method 700 ends.

FIG. 8 is a flow diagram illustrating a method 800 of providing a 3D video, in accordance with another embodiment of the present disclosure. The method 800 may be performed by processing logic that comprises hardware (e.g., circuitry, dedicated logic, programmable logic, microcode, etc.), software (e.g., instructions run on a processor to perform hardware simulation), or a combination thereof. In one embodiment, method 800 may be performed by an image module, as illustrated in FIGS. 2 and 5.

Referring to FIG. 8, the method 800 begins at block 805 where the method 800 receives a request to view images of the object from a viewpoint at a point in time. The method 800 identifies a camera based on the viewpoint at block 810. For example, referring back to FIG. 3, the method 800 may identify camera 110B based on the viewpoint selected by a user. The method 800 identifies an array of images based on the identified camera (block 815). For example, referring back to FIG. 3, the method 800 may identify image array 315B based on identifying camera 110B. At block 820 the method 700 sends images from the identified image array to a client device. At block 825, the method 800 identifies a group of cameras that are adjacent and/or near the camera identified in block 815. For example, if camera 110B was identified in block 815, the method 800 may identify camera 110A and 110C. At block 830, the method 800 identifies a group of images arrays associated with the group of cameras. For example, the method 800 may identify the image arrays 315A and 315C. At block 835, the method 800 sends the images from the group of images arrays to the client device. After block 835, the method 800 ends.

Figure 9:
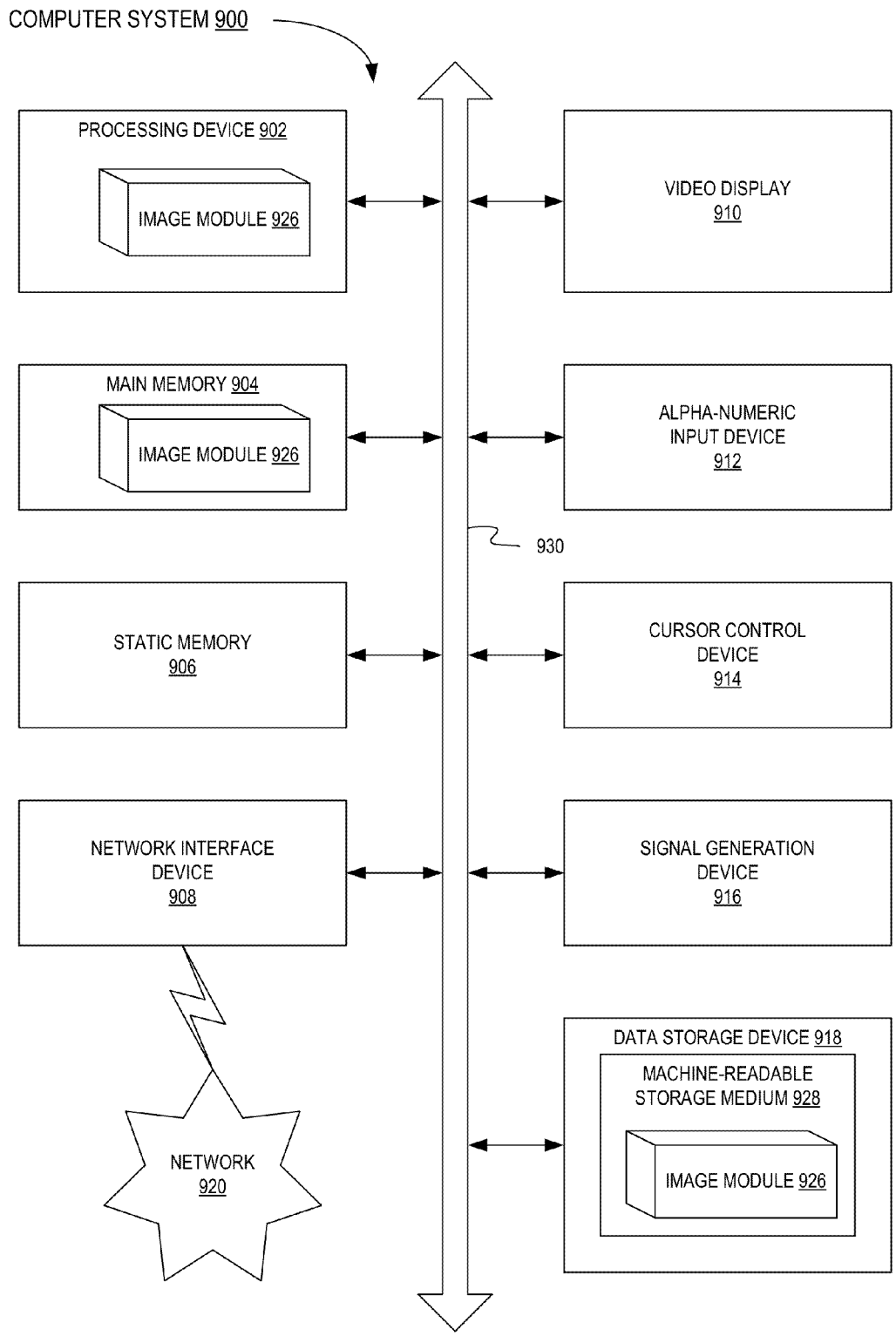
FIG. 9 is a block diagram of an example computing device that may perform one or more of the operations described herein.

FIG. 9 illustrates a diagrammatic representation of a machine in the example form of a computing device 900 within which a set of instructions, for causing the machine to perform any one or more of the methodologies discussed herein, may be executed. The computing device 900 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)) and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute image module 926 for performing the operations and steps discussed herein.

The computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and a signal generation device 916 (e.g., a speaker). In one embodiment, the video display unit 910, the alphanumeric input device 912, and the cursor control device 914 may be combined into a single component or device (e.g., an LCD touch screen).

The data storage device 918 may include a computer-readable storage medium 928 on which is stored one or more sets of instructions (e.g., image module 926) embodying any one or more of the methodologies or functions described herein. The image module 926 may also reside, completely or at least partially, within the main memory 904 and/or within the processing device 902 during execution thereof by the computing device 900, the main memory 904 and the processing device 902 also constituting computer-readable media. The instructions may further be transmitted or received over a network 920 via the network interface device 908.

While the computer-readable storage medium 928 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "receiving," "sending," "generating," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    identifying, by a processing device, an object to be viewed in a video, wherein the object is associated with a three-dimensional mesh generated based on a plurality of arrays of images of the object, each array of images being from a camera in a plurality of cameras positioned in a semi-spherical layout around the object, each camera positioned in one viewpoint from multiple viewpoints of the object, wherein the plurality of arrays of images of the object are stored in a three-dimensional data structure using an arrangement that is based on positions of corresponding cameras of the plurality of cameras in the semi-spherical layout around the object;
    receiving, from a client, a request to view images of the object from a first viewpoint from the multiple viewpoints, the request corresponding to a first point in time during playback of the video presenting the object from a viewpoint other than the first viewpoint;

identifying, by the processing device, a first array of images from a first camera positioned in the first viewpoint;
identifying, in the first array of images, a plurality of images with different timestamps that are later than or equal to the first point in time; and
using the plurality of images from the first array of images to cause presentation of the object to be continued from the first viewpoint during the playback of the video, wherein each image in the plurality of images has a timestamp that is later than or equal to the first point in time, and using the three-dimensional mesh associated with the object to allow a user of the client to interact with a virtual representation of the object during the playback of the video.

2. The method of claim 1, wherein each image in the first array of images is synchronized in time with images from other arrays of images.

3. The method of claim 1, further comprising:
receiving, from the client, a second request to view images of the object from a second viewpoint from the multiple viewpoints at a second point in time;
identifying a second camera based on the second viewpoint;
identifying a second array of images based on the second camera; and
sending, to the client, a second plurality of images from the second array of images, wherein each image in the second plurality of images has a second timestamp that is later than or equal to the second point in time.

4. The method of claim 1, further comprising:
identifying a group of cameras that are physically adjacent to the first camera;
identifying a subset of the arrays of images, wherein each array of images in the subset is associated with one camera from the group of cameras; and
sending images from the subset of the arrays of images to the client.

5. The method of claim 1, wherein the each array in the plurality of arrays of images is used to cause the presentation of the object from a viewpoint associated with the array during the playback of the video.

6. The method of claim 1, further comprising:
generating the three-dimensional mesh of the object based on the plurality of arrays of images of the object.

7. The method of claim 1, further comprising:
providing a media viewer to the client, the media viewer comprising a graphical user interface that allows a user to identify one or more viewpoints from the multiple viewpoints.

8. The method of claim 7, wherein the graphical user interface includes a viewpoint preview that provides a preview of the object from a different viewpoint.

9. The method of claim 1, wherein the plurality of arrays is stored in a three-dimensional data structure.

10. An apparatus comprising:
a memory having a three-dimensional data structure; and
a processing device, coupled to the memory, the processing device configured to:
identify an object to be viewed in a video, wherein the object is associated with a three-dimensional mesh generated based on a plurality of arrays of images of the object, each array of images being from a camera in a plurality of cameras positioned in a semi-spherical layout around the object, each camera positioned in one viewpoint from multiple viewpoints of the object, wherein the plurality of arrays of images of the object are stored in the three-dimensional data structure using an arrangement that is based on positions of corresponding cameras of the plurality of cameras in the semi-spherical layout around the object;
receive, from a client, a request to view images of the object from a first viewpoint from the multiple viewpoints, the request corresponding to a first point in time during playback of the video presenting the object from a viewpoint other than the first viewpoint;
identify a first array of images from a first camera positioned in the first viewpoint;
identify, in the first array of images, a plurality of images with different timestamps that are later than or equal to the first point in time; and
use the plurality of images from the first array of images to cause a presentation of the object to be continued from the first viewpoint during the playback of the video, wherein each image in the plurality of images has a timestamp that is later than or equal to the first point in time, and use the three-dimensional mesh associated with the object to allow a user of the client to interact with a virtual representation of the object during the playback of the video.

11. The apparatus of claim 10, wherein the processing device is further configured to:
receive, from the client, a second request to view images of the object from a second viewpoint from the multiple viewpoints at a second point in time;
identify a second camera based on the second viewpoint;
identify a second array of images based on the second camera; and
send, to the client, a second plurality of images from the second array of images, wherein each image in the second plurality of images has a second timestamp that is later than or equal to the second point in time.

12. The apparatus of claim 10, wherein the processing device is further configured to:
identify a group of cameras that are physically adjacent to the first camera;
identify a subset of the arrays of images, wherein each array of images in the subset is associated with one camera from the group of cameras; and
send images from the subset of the arrays of images to the client.

13. The apparatus of claim 10, wherein the processing device is further configured to:
generate the three-dimensional mesh of the object based on the plurality of arrays of images of the object.

14. The apparatus of claim 10, wherein the processing device is further configured to:
provide a media viewer to the client, the media viewer comprising a graphical user interface that allows a user to identify one or more viewpoints from the multiple viewpoints, wherein the graphical user interface includes a viewpoint preview that provides a preview of the object from a different viewpoint.

15. The apparatus of claim 10, wherein each image in the first array of images is synchronized in time with images from other arrays of images.

16. A non-transitory computer readable storage medium having instructions that, when executed by a processing device, cause the processing device to perform operations comprising:
identifying an object to be viewed in a video, wherein the object is associated with a three-dimensional mesh generated based on a plurality of arrays of images of the object, each array of images being from a camera in a plurality of cameras positioned in a semi-spherical layout around the object, each camera positioned in one viewpoint from multiple viewpoints of the object, wherein the plurality of arrays of images of the object are stored in a three-dimensional data structure using an arrangement that is based on positions of corresponding cameras of the plurality of cameras in the semi-spherical layout around the object;

receiving, from a client, a request to view images of the object from a first viewpoint from the multiple viewpoints, the request corresponding to a first point in time during playback of the video presenting the object from a viewpoint other than the first viewpoint;

identifying, by the processing device, a first array of images from a first camera positioned in the first viewpoint;

identifying, in the first array of images, a plurality of images with different timestamps that are later than or equal to the first point in time; and using the plurality of images from the first array of images to cause presentation of the object to be continued from the first viewpoint during the playback of the video, wherein each image in the plurality of images has a timestamp that is later than or equal to the first point in time, and using the three-dimensional mesh associated with the object to allow a user of the client to interact with a virtual representation of the object during the playback of the video.

17. The non-transitory computer readable storage medium of claim 16, wherein the operations further comprise:

receiving, from the client, a second request to view images of the object from a second viewpoint from the multiple viewpoints at a second point in time;

identifying a second camera based on the second viewpoint;

identifying a second array of images based on the second camera; and sending, to the client, a second plurality of images from the second array of images, wherein each image in the second plurality of images has a second timestamp that is later than or equal to the second point in time.

18. The non-transitory computer readable storage medium of claim 16, wherein the operations further comprise:

identifying a group of cameras that are physically adjacent to the first camera;

identifying a subset of the arrays of images, wherein each array of images in the subset is associated with one camera from the group of cameras; and sending images from the subset of the arrays of images to the client.

19. The non-transitory computer readable storage medium of claim 16, wherein the operations further comprise:

generating the three-dimensional mesh of the object based on the plurality of arrays of images of the object.

20. The non-transitory computer readable storage medium of claim 16, wherein the operations further comprise:

providing a media viewer to the client, the media viewer comprising a graphical user interface that allows a user to identify one or more viewpoints from the multiple viewpoints, wherein the graphical user interface includes a viewpoint preview that provides a preview of the object from a different viewpoint.

\* \* \* \* \*